United States Patent
Tollkühn et al.

(10) Patent No.: US 9,810,790 B2
(45) Date of Patent: Nov. 7, 2017

(54) METHOD FOR EVALUATING A SATELLITE SIGNAL IN A GLOBAL NAVIGATION SATELLITE SYSTEM WITH RESPECT TO A MULTIPATH ERROR, RECEIVER FOR A GLOBAL NAVIGATION SATELLITE SYSTEM AND MOTOR VEHICLE

(71) Applicant: Audi AG, Ingolstadt (DE)

(72) Inventors: Andreas Tollkühn, Ingolstadt (DE); Florian Mickler, Ingolstadt (DE); Anton Beitler, Zürich (CH)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/508,840

(22) PCT Filed: Aug. 18, 2015

(86) PCT No.: PCT/EP2015/001694
§ 371 (c)(1),
(2) Date: Mar. 3, 2017

(87) PCT Pub. No.: WO2016/034267
PCT Pub. Date: Mar. 10, 2016

(65) Prior Publication Data
US 2017/0276794 A1  Sep. 28, 2017

(30) Foreign Application Priority Data
Sep. 6, 2014 (DE) .......................... 10 2014 013 209

(51) Int. Cl.
*G01S 19/22* (2010.01)
(52) U.S. Cl.
CPC .................................. *G01S 19/22* (2013.01)

(58) Field of Classification Search
None
See application file for complete search history.

(56) References Cited

U.S. PATENT DOCUMENTS 6,329,945 B1   12/2001   Hynes
9,329,274 B2*   5/2016   Schipper ................. G01S 19/22
(Continued)

FOREIGN PATENT DOCUMENTS

| DE | 102008004068 A1 | 7/2009 |
| DE | 102012216211 A1 | 3/2013 |
| EP | 2078965 A2 | 7/2009 |

OTHER PUBLICATIONS

English-language abstract of German Patent Application Publication No. 10 2008 004 068 A1, published Jul. 23, 2009; 2 pages.
(Continued)

*Primary Examiner* — Gregory C. Issing
(74) *Attorney, Agent, or Firm* — Sterne, Kessler, Goldstein & Fox, PLLC

(57) ABSTRACT

A method is disclosed for evaluating a satellite signal in a global navigation satellite system with regard to a multipath error, wherein a receiver determines a run-time gap between the receiver and a satellite based on a run-time measurement from the satellite signals of several satellites and a carrier-phase gap based on the carrier-phase measurement between the receiver and the satellite or a reference point, wherein a difference of the time derivative of the run-time gap and of the carrier-phase gap is formed in the receiver as an evaluation variable, which is evaluated using at least one multipath criterion for the presence of a multipath error.

13 Claims, 3 Drawing Sheets

(56) References Cited

U.S. PATENT DOCUMENTS

| | | | |
|---|---|---|---|
| 2005/0212696 A1* | 9/2005 | Bartone | G01S 19/43 342/357.27 |
| 2005/0216210 A1* | 9/2005 | Bartone | G01S 19/43 702/56 |
| 2008/0265097 A1 | 10/2008 | Stecko et al. | |
| 2010/0245171 A1 | 9/2010 | Zeng | |
| 2012/0299770 A1* | 11/2012 | Lee | G01S 19/22 342/357.25 |
| 2014/0333479 A1 | 11/2014 | Steinhardt | |

OTHER PUBLICATIONS

English-language abstract of European Patent Application Publication No. 2078965 A2, published Jul. 15, 2009; 2 pages.

Blanco-Delgado, et al.: "Multipath Analysis using Code-minus-Carrier for Dynamic Testing of GNSS Receivers," IEEE. 2011; 6 pages.

Lee, et al.: "GPS Multipath Detection Based on Sequence of Successive-Time Double-Differences," IEEE Signal Processing Letters, vol. 11, No. 3, Mar. 2004; 4 pages.

Kaplan, et al.: "Understanding GPS Principles and Applications," Artech House, Inc. ($2^{nd}$ Ed. 2006); 723 pages.

Hewitson, et al.: "Extended Receiver Autonomous Integrity Monitoring (eRAIM) for GNSS/INS Integration," ASCE Journal of Surveying Engineering, Feb. 2010; 10 pages.

Schroth, et al.: "Enhancements of the Range Consensus Algorithm (RANCO)," Proceedings of the ION GNSS Conference, 2008; 11 pages.

Braasch, Michael S.: "Multipath Effects," Global Positioning System Theory and Applications 1996, vol. I, pp. 547-568. 22 pages.

Misra, et al.: "Global Positioning System: Signals, Measurements, and Performance," Ganga-Jamuna Press, 2011, p. 178. 1 page.

International Search Report and Written Opinion of the International Searching Authority directed to related International Patent Application No. PCT/EP2015/001694, dated Nov. 3, 2015, with attached English-language translation; 24 pages.

International Written Opinion of the Authority in Charge of International Preliminary Examination directed to related International Patent Application No. PCT/EP2015/001694, dated Aug. 16, 2016, with attached English-language translation; 9 pages.

International Preliminary Report on Patentability directed to related International Patent Application No. PCT/EP2015/001694, dated Nov. 25, 2016, with attached English-language translation; 14 pages.

* cited by examiner

METHOD FOR EVALUATING A SATELLITE SIGNAL IN A GLOBAL NAVIGATION SATELLITE SYSTEM WITH RESPECT TO A MULTIPATH ERROR, RECEIVER FOR A GLOBAL NAVIGATION SATELLITE SYSTEM AND MOTOR VEHICLE

TECHNICAL FIELD OF THE INVENTION

The invention relates to a method for evaluating a satellite signal global navigation satellite system with respect to a multipath error, wherein, within the framework of a position determination from the satellite signals of several satellites, a receiver that is in particular movable specifies a run-time gap based on a run-time measurement between the receiver and the satellite and a carrier-phase gap based on a carrier-phase measurement between the receiver and the satellite or a reference point, a receiver for a global navigation satellite system and a motor vehicle.

BACKGROUND

Global navigation satellite systems (GNSS) are already widely known as state of the art technology. They have in common that a large number of satellites in earth orbit send signals which are normally modulated to a carrier frequency and describe the position of the satellite and a broadcast time of the so-called code signal. Via the code signal with the position of the satellite and the time of the transmission, a three-dimensional position on the earth can basically be determined just from the satellite signals of three satellites if the clocks in a receiver are perfectly synchronized with those of the satellites, after which a distance (run-time measurement) results from the run-time of the satellite signals, and the points of intersection on the spherical surfaces that result from the distance between the receiver and the satellite are located. Since a clock error is usually present, the satellite signals from four satellites are required in order to be able to determine a three-dimensional position on the earth using a run-time measurement, since there are then four equations for four unknowns. Signals from other satellites are frequently used for plausibility checks and the like. Methods were also proposed that work with fewer than four satellite signals, these then work with movement models and/or temporal correlations.

In the method described here, the position is determined using the run time of the satellite signal from the satellite to the receiver, from which the distance between the satellite and the receiver is derived. This resulting distance together with the receiver clock error is usually designated as the "pseudo-range"; the run-time measurement is often designated as the "code measurement" "code-phase measurement" since it evaluates the code modulated on the carrier frequency of the satellite's signals.

Given a clear line of sight to the sky, simple GNSS receivers today achieve a precision of under 5 m 95% of the time. Because of the high speed of light, in most cases this still results in inaccuracies in the run-time measurement. Many modern GPS receivers therefore use yet another variable for distance measurements, namely the so-called carrier-phase measurement, which uses Doppler measurements in which the carrier frequency phase and its change is analyzed. While phase measurements in the determination of distances for other uses such as time-of-flight cameras are extremely common, there exists GNSS receivers the problem that it is unknown how many full wave trains there are between the satellite and the GNSS receiver. Therefore, there is always an ambiguity in a phase measurement since it is not known how many full wavelengths have already been completed. Consequently, the Doppler measurement (carrier-phase measurement) usually refers to a reference point from which the phase is most commonly observed and, thus, the number of wavelengths to this reference, at least, is known. Methods have also been proposed in which the number of complete wavelengths to the satellite is estimated in older to also determine a distance between the receiver and the satellite using the carrier-phase measurement. A problem can occur during a temporary loss of the satellite signal, since then a passage of at least one wavelength is, if applicable, missed, so that a loss of the phase relationship occurs. The causes of this can, for example, be signal blocking by obstructions, but also multipath effects and the like. Such a loss of the phase relationship is designated as a "loss of lock" and mostly results in a jump in the measurement of the carrier phase ("cycle slip"). The run-time measurement, however, is not influenced by this.

In many modern applications, particularly in motor vehicles, a very high localization accuracy is now required in the receiver, for example, in advanced driving-assistance systems in motor vehicles. In the context of a GNSS measurement, a plurality of errors occur, of which the "multipath error" caused by multipath effects is one. In built-up areas and, above all, on narrow streets or around high house facades, shadows and reflections often occur that can thus lead to large position errors. If a line-of-sight connection to the appropriate satellite still remains, the satellite signal received by direct line-of-sight (LOS) and multipath signals that are overlaid on it, reflected or slightly shifted are present, result in effects similar to a beat and like. Several methods have been proposed to suppress multipath effects using hard and/or software.

A first approach concerns the adjustment of parameters correlator provided on the input side of the receiver, wherein high bandwidths of the pre-correlator as well as narrow correlator distances increase the robustness compared to satellite signals bearing multipath errors; see, for example, the standard work by E. D. Kaplan and C. J. Hegarty, "Understanding GPS—Principles and Applications", Norwood: Artech House 2005. A further proposed approach is the use of derivatives of RAIM (Receiver. Autonomous Integrity Monitoring) to recognize faulty satellite signals/distance measurements. A distinction is made between sequential and snapshot RAIM. With Snapshot RAIM, the simultaneous observations of different satellites are verified against each other. An observation whose residuum exceeds an appropriate threshold is discarded. With sequential RAIM, predictions from past measurements are used for the formation of residue; see, for example, the article by S. Hewitson and J. Wang, "Extended Receiver Autonomous Integrity Monitoring GNSS/INS Integration", Journal of Surveying Engineering, Vol. 136, no. 1 pp. 13-22, 2010.

In addition to detection methods based on the pseudo range, thus on the run-time measurement, approaches also exist which use a receiver's additional output variables, for example, the result of the Doppler measurement. This exploits the fact that the multipath error affects the carrier-phase measurement and the run-time measurement differently. By subtracting the distance (Doppler distance) identified by the Doppler measurement (carrier-phase measurement) from the distance (run-time distance) identified by the run-time measurement based on modulated code, the so-called Code-Minus-Carrier (CMC) variable can be formed and the amount of the additional multipath error estimated, as is described, for example, article by M. S.

Braasch, "Multipath effects", in: Global Positioning System Theory and Applications, Vol. 1, pp. 547-568, 1996. The CMC variable or similar variables can also be analyzed in the frequency range and a multipath frequency characteristic for the geometry can be damped.

In general, it must be noted that the multipath error is a local phenomenon. Consequently, no correction on the basis of a reference infrastructure (for example, differential GPS) can be made. A receiver-autonomous detection method must therefore be employed. The state of the art methods in known to date, however, have some disadvantages.

The widespread, snapshot RAIM methods of error detection and identification require a minimum number of visible satellites. Detection of a multipath error is only possible with five satellite signals, while the identification of an erroneous observation can only take place if six satellite signals exist. Out of n observations, variations of the traditional RAIM can identify the n−5 faulty ones; see also G. Schrott, M. Rippl, A. Ene, J. Blanch, B. Belabbas, T. Walter, P. Enge and M. Meurerm, "Enhancements of the Range Consensus algorithm (RANCO)", in: Proceedings of the ION GNSS Conference, 2008.

For many actually occurring applications, however, the high number of satellite signals needed is a significant restriction. It is precisely in urban areas, where multipath propagation is a major challenge, high house facades can block a large portion of the view to the sky. In such urban canyons, therefore, there is often not a sufficient number of satellites which can be received for detection of a satellite signal burdened with a multipath error.

For methods that are based on sequential RAIM, a status estimator is required to determine the predictions based on past measurements. This introduces additional complexity, and model and prediction errors are inevitable.

For static applications, the use of the CMC variable in particular has proven extremely beneficial; see again the aforementioned article by M. S. Baasch. The application of the method becomes problematic, however, in the case of a moving receiver, as is used in motor vehicles, for example. The previously described cycle slips then occur significantly more frequently, which complicates the carrier phase ambiguity estimation. However, a resolved carrier phase ambiguity resolution is required to produce the CMC variable. Even methods that work in the frequency range fail in the dynamic case, because a constantly changing geometry prevents the formation of a characteristic frequency in the observations.

DETAILED DESCRIPTION

Figure 1:
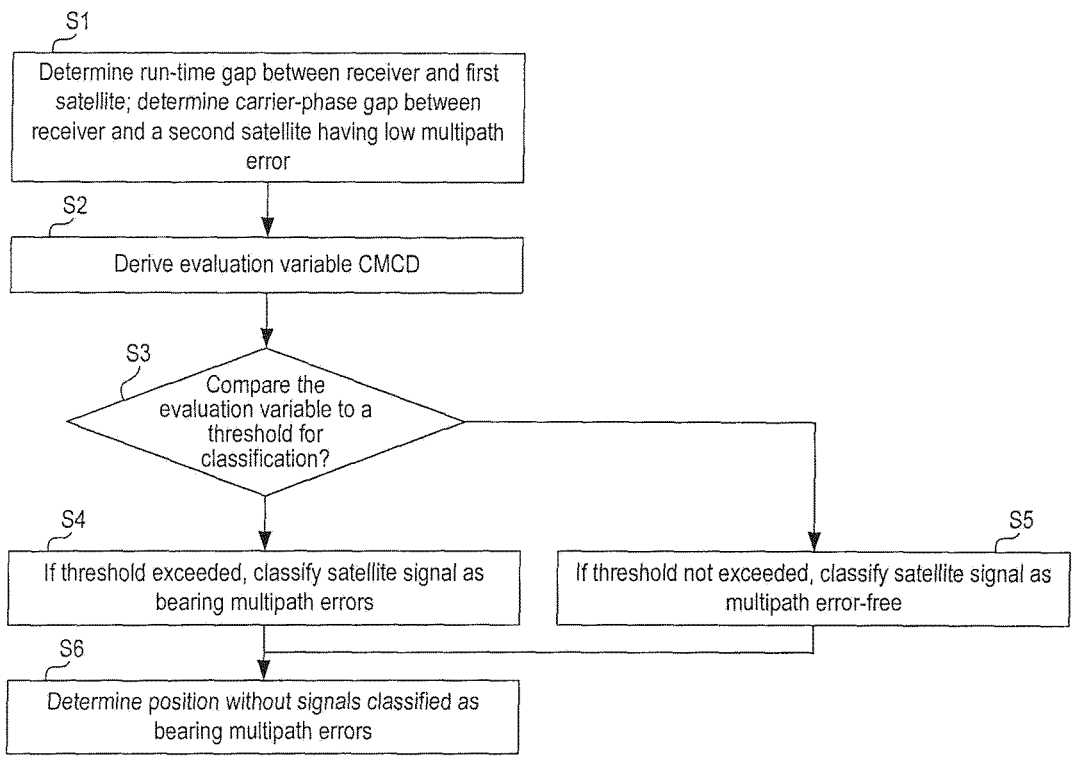
FIG. 1 is a flow chart of an embodiment of the inventive method.

The invention is therefore based on the task of specifying an improved possibility for detection of satellite signals bearing multipath errors, in particular in moving GNSS receivers.

To solve this task, it is planned in a method of the aforementioned type according to the invention that a difference of the time derivative of the run-time gap and of the Doppler distance is generated in the receiver as an evaluation variable, which is evaluated using at least one multipath criterion for the presence of a multipath error.

Thus according to the invention, a variable is also considered which can be referred to as a "Code-Minus-Carrier Delta Range" (CMCD) in the context of GNSS, a variable referred to as a delta range (or also "range rate") which can be derived from the run-time measurement and the carrier-phase measurement using a time derivative of the respective distances. As is the case with other methods that use the CMC variable, the invention takes advantage of the fact that a multipath error operates with different strengths on the measurement values of the run-time measurement, the carrier-phase measurement and of the Doppler measurement upon which the carrier-phase measurement is based. Therefore, an existing error can be detected by a mutual plausibility check, wherein, for example, the multipath error caused by multipath reception in the run-time measurement and the carrier-phase measurement differ by two orders of magnitude; see for example pp. 178 of the Foundation work by P. Misra and P. Enge, "Global Positioning System:" Signals, Measurements, and Performance", Ganga-Jamuna Press, 2011.

The present invention thus assumes certain error models for the formation of the evaluation variable based on the delta range and for its motivation. As an error model for the run-time measurement (pseudo-range), it is proposed that the run-time gap results in $$\rho^{(k)}(t) = r^{(k)}(t, t-\tau) + c[\delta t_u(t) - \delta t^{(k)}(t-\tau)] + I^{(k)}(t) + T^{(k)}(t) + \alpha m_\rho^{(k)}(t) + \epsilon_\rho^{(k)}(t) \quad \text{equation (1)},$$

wherein for the carrier phase measurement $$\lambda\phi^{(k)}(t) = r^{(k)}(t, t-\tau) + c[\delta t_u(t) - \delta t^{(k)}(t-\tau)] - I^{(k)}(t) + T^{(k)}(t) + \lambda N + \alpha m_\phi^{(k)}(t) + \epsilon_{100}^{(k)}(t) \quad \text{equation (2)}$$

is accordingly assumed for the carrier phase gap, wherein, respectively;

| | |
|---|---|
| t | receiving time |
| k = 1, . . . , K | satellite number |
| $r^{(k)}$ (t, t − τ) | geometric (true) distance between the receiver position at the time t and the satellite position at the sending time t − τ |
| τ | transmission time [s] |
| c | speed of light [m/s] |
| $\delta t_u$ (t) | receiver clock error (relative to the GNSS time) |
| $\delta t^{(k)}$ (t − τ) | satellite clock error (relative to the GNSS time) |
| $I^{(k)}$ (t), $T^{(k)}$ (t) | ionospheric and tropospheric errors |
| α | binary indicator variable (1: multipath effects present, 0; multipath effects not present) |
| $m_\rho$ (t) | run-time measurement multipath error |
| $\epsilon_\rho$ (t) | unmodeled error (e.g. receiver noises, diffuse reflections) |
| N | carrier-phase ambiguity |
| λ | wavelength of the carrier signal |
| $m_\phi$ (t) | carrier-phase measurement multipath error |
| $\epsilon_\phi$ (t) | unmodeled error. |

According to the present invention, the Code-Minus-Carrier Delta range (CMCD), which is used as an evaluation variable, is then determined as $$CMCD = \dot\rho^{(k)} - \lambda\dot\phi^{(k)} \approx (\dot r^{(k)} + c\delta \dot t_u(t) + \alpha \dot m^{(k)} + \dot\epsilon_\rho^{(k)}) - (\dot r^{(l)} + c\delta \dot t_u(t) + \alpha \dot m_\phi^{(l)} + \dot\epsilon_\phi^{(l)}) \approx (\dot r^{(k)} - \dot r^{(l)}) + \alpha(\dot m_\rho^{(k)} - \dot m_\rho^{(l)}) + (\dot\epsilon_\rho^{(k)} - \dot\epsilon_\phi^{(l)}) \approx (\dot r^{(k)} - \dot r^{(l)}) + \alpha \dot m_\rho^{(k)} + \dot\epsilon_\rho^{(k)} \quad \text{equation (3)}$$

With this it is clearly assumed that the time dependency of the atmospheric errors, which occur dually due to dispersion effects, describe a slow change, so that the corresponding derivative is negligibly small. It is advantageous to recognize that the phase ambiguity, meaning the carrier-phase ambiguity, is eliminated because of the fact that it is not time dependent, so that cycle slips to longer present a problem. The assumption $$\dot{m}_\phi^{(l)} \approx 0$$

is basically valid only if a satellite signal is received directly in line of sight (LOS), so that in a case where a satellite signal is composed only of multipath signals the so-called NLOS case, the model is imprecise; however, the use of the evaluation variable is, possible after the satellite signal is definitely loaded with the multipath error and deviates significantly from normal course so that the multipath criterion should respond.

Two different approaches are obviously conceivable here, it being preferable that the evaluation variable is determined from distances derived from the same satellite signal. In the above formula (3) this means that k=1 applies, which is also preferred because the detection for each satellite signal can be performed independently and there is no need to compare the observations among the individual satellite signals, meaning also a minimum number of observations does not have to be specified. However, it may also be provided that the evaluation variable is determined from a run-time gap derived from the satellite signal of a first satellite and from a carrier-phase gap, derived from the satellite signal of a different, second satellite, wherein one of the satellites is a reference satellite having a low multipath error. If, therefore, a satellite that has a low multipath error is known from the outset, it can be used as a reference satellite which, as stated, is nevertheless less preferred. In particular, a geometric term then remains, the term of the last line of equation (3), so that it is appropriate, if the evaluation variable is corrected for an additional term (geometric term) produced by different relative speeds between receiver and satellite, to take into account speed information of at least the satellites, in particular of the satellites and of the receiver. This means that the additional term (geometric term) can be quite well estimated from present information, so that the evaluation variable can be used after appropriate correction.

Without multipath reception, the evaluation variable in the case of distances arising from the same satellite corresponds to an intensified receiver noise. With multipath reception, an additional noise process occurs, which causes a change in the statistical properties of the evaluation variable; namely, it shows a wider frequency band with significantly larger deflections (amplitudes) over time. Therefore, multipath criteria can be formulated as a hypothesis test, which detect the additional noise process and thus allow the run-time measurement or the satellite signal itself to be classified as affected by multipath errors or free of multipath errors. In other words, it can allow the multipath criterion to evaluate the size a in equations (1) to (3) as zero or one. Thus, a satellite signal can be classified as affected by multipath error in a simple and reliable manner.

An advantage of the process according to the invention is that the evaluation variable CMCD can be created purely from measurement data present in commercially available GNSS receivers. This type of multipath detection is thus independent of reference data and any infrastructure. The advantages of viewing a single satellite signal have already been explained.

A further advantage of the multipath error detection in satellites described here is that the evaluation variable can also be used in a dynamic situation, that is, in a receiver moved by a motor vehicle, for example, since the multipath process is represented as a broadband noise in the evaluation variable and thus cycle slips in particular can be seen as a negligible interference process.

Immunity with respect to slow error processes results from the differential character of CMCD, meaning from the evaluation variable. Included in this are ionosphere errors, troposphere errors and carrier-phase ambiguity, as stated above. This increases the robustness of the detection algorithm and reduces the complexity of the technical implementation. Two registers and three adders are sufficient for concrete implementation of the evaluation variable determination.

As has already been mentioned, it is provided in particular within framework of the present invention that, using the multipath criterion, the tested satellite signal is classified as free from multipath errors or affected by multipath errors. Thus it can be specifically provided that a characteristic value is determined for the multipath criterion using a statistical analysis of the most recently identified evaluation variable in a sliding window, which, is compared to a threshold value to differentiate between a multipath error-free satellite signal and one affected by multipath errors. As already indicated, the presence of multipath errors not only causes the evaluation variable to contain increased background noise, but an additional broadband noise occurs which additionally has significantly stronger deflections, thus enabling, statistical evaluations within a sliding window in order to detect multipath errors quickly and reliably. Thus, it can be specifically provided that a maximum amount of the evaluation variable in the sliding window is considered to be the characteristic value and/or the standard deviation of the evaluation variables in the sliding window is considered to be the characteristic value, wherein the threshold value in particular is applied as at least a multiple of a variance in a secured, multipath-error-free process. The specific multiplier can thus be chosen, as a function of the expected statistical errors of the first and second type. Both variations make use of the fact that because of the multipath error, broadband additional noise has greater deflections than may occur with increased receiver noise in a similarly Gaussian distribution. Of course, other ways of formulating the multipath criterion are in principle possible in order to describe the changes in statistical behavior arising from the additional noise.

As mentioned above, the method according to the invention may be especially advantageously employed in a moving receiver, in particular when used in a receiver built into or located in a motor vehicle. The method according to the invention can also be used in global navigation satellite systems (GNSS) with which a run-time measurement and a carrier-phase measurement is possible, so that, for example, GPS and/or Galileo and/or GLONASS and/or Beidou (Compass) can be used as a global navigation satellite system.

In addition to the method, the invention also relates to a receiver for a global navigator satellite system which has a computing device designed for excuting the method according to the invention. This method according to the invention can be especially appropriately integrated as a whole into the usual algorithms for determining the current position of the receiver, in which certain satellite signals that are detected as bearing multipath errors are removed from further consideration or the like. All designs related to the method according to the invention can be analogously transferred to the receiver according to the invention, with which the same advantages can likewise be obtained.

Finally the invention relates to a vehicle that has a receiver according to the invention. Motor vehicles are often moved at greater speeds so that precisely here the methods used so far for detection of multipath errors cannot be used in a sufficiently robust and reliable manner. This changes with the use of the method according to the invention, which offers precisely this robustness and reliability in the detection of multipath errors based on the facts presented above.

Figure 2:
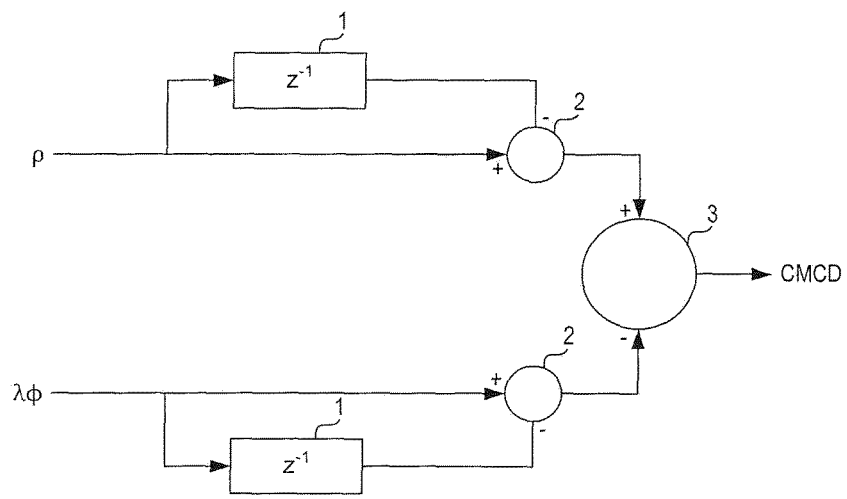
FIG. 2 is a block diagram for determining the evaluation variable.
Figure 3:
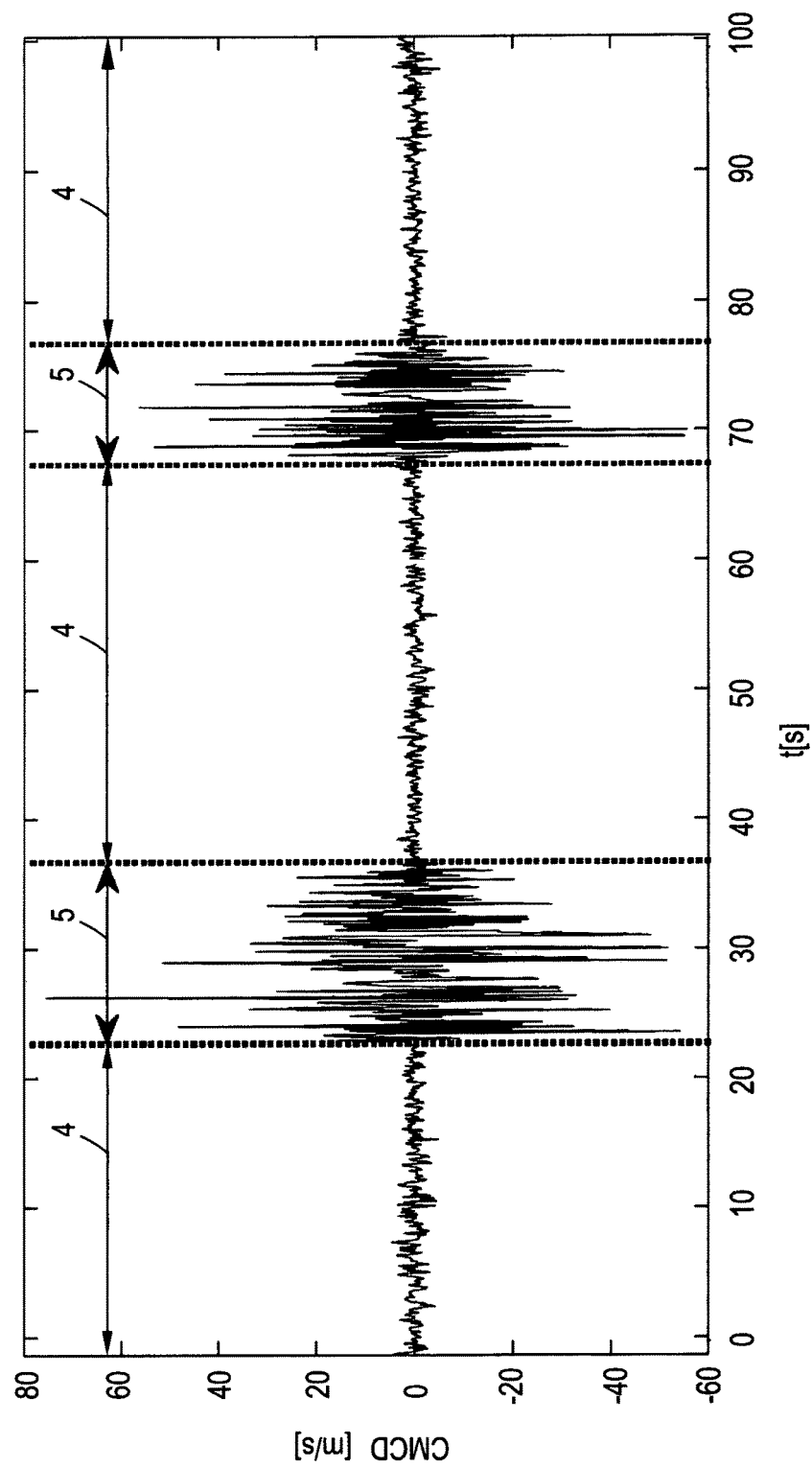
FIG. 3 is a possible temporal profile of the evaluation variable.

Further advantages and details of the present invention arise from the exemplary embodiments described below and in reference to the drawings. The following is shown:

FIG. 1 is a flow chart of an embodiment of the inventive method,

FIG. 2 is a block diagram for determining the evaluation variable,

FIG. 3 is a possible temporal profile of the evaluation variable, and

Figure 4:
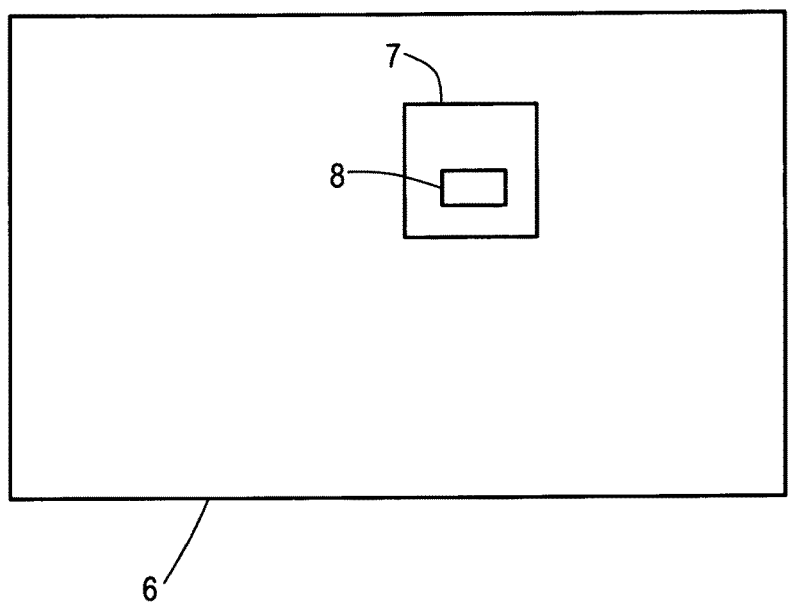
FIG. 4 is a motor vehicle according to the invention.

FIG. 4 is a motor vehicle according to the invention.

FIG. 1 shows a flow chart of the method according to the invention which is integrated into the general position determination within a GNSS receiver. In a step S1, the run-time gap between the receiver and the satellite, determined in the usual manner within the GNSS receiver, by a run-time measurement using an evaluation of the carrier frequency of the satellite signal's modulated code; and the carrier-phase measurement between the receiver and the satellite or a reference point, determined by a carrier-phase gap with underlying Doppler measurement based on it, is determined and provided.

In a step S2, these distances (and their temporal profile) are used to derive the evaluation variable CMCD, as is described in equation (3). In this case, the time derivative is determined by the differentiation between the respective current distance and the previously specified distance maintained in a register, as is shown in the block diagram in FIG. 2. There the run-time gap is indicated with $\rho$, the carrier-phase gap with $\lambda\Phi$. Register 1 maintains the previously determined time values. Adder 2 is used for differentiation to determine the respective delta ranges. An additional adder 3 subtracts both delta ranges from each other according to the definition in equation (3) to obtain the evaluation variable CMCD. Of course, the block diagram in FIG. 2 only represents a simple potential embodiment; time derivatives can also be determined by taking into account several historical values and the like or in another manner; in particular, the determination of the CMCD can take place using software components.

FIG. 3 shows a sample run of the evaluation variable CMCD applied to the time t in a time span of about 100 seconds. If the underlying satellite signal with which, in this instance, the run-time gap and the carrier-phase gap of the same satellite signal are evaluated, is multipath error-free, then area 4 only shows the reinforced receiver noise with small deflections, which means small maximum values for the evaluation variable. In areas 5, however, there are multipath effects so that a clearly different behavior results in which a broadband noise with strong deflections, that is, high amplitudes, is given.

In a step S3, again referring to FIG. 1, evaluation variables are used for classification as to whether the satellite signal is loaded with multipath errors. For this a statistical analysis of the progression of the evaluation variable is conducted, in this case a multipath criterion is used that compares the maximum magnitude of the evaluation variable within a sliding window over the course that always ends with the current value of the evaluation variable with a threshold value, here, purely as an example, 5 m per second. If this threshold is exceeded, the satellite signal is then classified and marked as bearing multipath errors in a step S4. If the threshold is, however, not exceeded, in a step S5, the satellite signal from which the evaluation variable is derived is classified and marked as multipath error-free. Of course, this classification of the hypothetical test carried out in the step S3 is constantly updated and the classification performed for all satellite signals received.

In a step S6, a position determination can then take place wherein the satellite signals marked as bearing multipath errors and the distances derived from them are ignored.

Of course, additional or alternative or different evaluation criteria can be used in step S3, for example that assess the standard deviation of the evaluation variable in the sliding window.

Finally, FIG. 4 shows a schematic diagram of a motor vehicle 6 according to the invention that has a GNSS receiver 7 according to the invention, here a GPS receiver. This contains a computing device 8 designed to carry out the method according to the invention.

The invention claimed is:

1. A method for evaluating a satellite signal in a global navigation satellite system with regard to a multipath error within a framework of a position determination from satellite signals of several satellites, the method comprising:
   determining, at a receiver, a run-time gap based on a run-time measurement between the receiver and a first satellite;
   determining a carrier-phase gap based on a carrier-phase measurement between the receiver and a reference point;
   forming, at the receiver, an evaluation variable from a difference of a time derivative of the run-time gap and of the carrier-phase gap; and
   evaluating a presence of a multipath error by applying a multipath criterion to the evaluation variable;
   wherein the run-time gap is derived from a satellite signal of the first satellite and the carrier-phase gap is determined from a second satellite that is distinct from the first satellite, wherein the second satellite is a reference satellite having a low multipath error.

2. The method of claim 1, wherein the evaluation variable is corrected for additional term created by different relative speeds between the receiver and the first satellite and the receiver and the second satellite, based on speed information of the first satellite, the second satellite and the receiver.

3. The method of claim 1, wherein based on the multipath criterion, the satellite signal of the first satellite is classified as free from multipath errors or affected by multipath errors.

4. The method according of claim 3, further comprising:
   determining a characteristic value for the multipath criterion using a statistical analysis of evaluation variables most recently determined in a sliding window, wherein the characteristic value is compared to a threshold value to differentiate between the satellite signal of the first satellite having no multipath errors or having multipath errors.

5. The method of claim 4, wherein a maximum amount of the evaluation variables is considered to be the characteristic value, or a standard deviation of the evaluation variable in the sliding window is considered to be the characteristic value, wherein the threshold value is applied as a multiple of the standard deviation in a secure, multipath error-free process.

6. The method of claim 1, wherein the receiver is built into or located in a motor vehicle, and the receiver is mobile.

7. The method of claim 1, wherein the global navigation satellite system is at least one of a global positioning system (GPS), a Galileo, a GLONASS, or a Beidou system.

8. A receiver for a global navigation satellite system configured to:
- determine a run-time gap based on a run-time measurement between the receiver and a first satellite;
- determine a carrier-phase gap based on a carrier-phase measurement between the receiver and a reference point;
- form an evaluation variable from a difference of a time derivative of the run-time gap and of the carrier-phase gap; and
- evaluate a presence of a multipath error by applying a multipath criterion to the evaluation variable;
- wherein the run-time gap is derived from a satellite signal of the first satellite and the carrier-phase gap is determined from a second satellite that is distinct from the first satellite, wherein the second satellite is a reference satellite having a low multipath error.

9. The receiver of claim 8, wherein the evaluation variable is corrected for an additional term created by different relative speeds between the receiver and the first satellite, based on speed information of the first satellite and the receiver.

10. The receiver of claim 8, wherein based on the multipath criterion, the satellite signal is classified as free from multipath errors or affected by multipath errors.

11. The receiver of claim 10, wherein the receiver is further configured to:
- determine a characteristic value for the multipath criterion using a statistical analysis of evaluation variables most recently determined in a sliding window, wherein the characteristic value is compared to a threshold value to differentiate between the satellite signal having no multipath errors or having multipath errors.

12. The receiver of claim 11, wherein a maximum value of the evaluation variables in the sliding window is considered to be the characteristic value, and/or a standard deviation of the evaluation variable in the sliding window is considered to be the characteristic value, wherein the threshold value is applied as a multiple of the standard deviation in a secure, multipath error-free process.

13. The receiver of claim 8, wherein the receiver is built into or located in a motor vehicle, and the receiver is mobile.

* * * * *